United States Patent
Wu et al.

(10) Patent No.: US 11,979,620 B2
(45) Date of Patent: May 7, 2024

(54) SYSTEM, NON-TRANSITORY COMPUTER READABLE STORAGE MEDIUM AND METHOD FOR AUTOMATICALLY PLACING VIRTUAL ADVERTISEMENTS IN SPORTS VIDEOS

(71) Applicant: Industrial Technology Research Institute, Hsinchu (TW)

(72) Inventors: Sheng-Han Wu, Yilan County (TW); Feng-Sheng Lin, Hsinchu County (TW); Ruen-Rone Lee, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 377 days.

(21) Appl. No.: 17/554,623

(22) Filed: Dec. 17, 2021

(65) Prior Publication Data
US 2023/0199233 A1    Jun. 22, 2023

(51) Int. Cl.
*G06T 7/00*    (2017.01)
*G06T 7/194*    (2017.01)
(Continued)

(52) U.S. Cl.
CPC ....... *H04N 21/23424* (2013.01); *G06T 7/194* (2017.01); *G06V 20/42* (2022.01);
(Continued)

(58) Field of Classification Search
CPC ............... H04N 21/812; H04N 5/2723; H04N 21/23424; H04N 5/2224; H04N 5/272;
(Continued)

(56) References Cited

U.S. PATENT DOCUMENTS

| 7,158,666 B2 | 1/2007 | Deshpande et al. |
| 10,332,159 B2 | 6/2019 | Han et al. |

(Continued)

FOREIGN PATENT DOCUMENTS

| CN | 109523297 A | 3/2019 |
| CN | 109804412 A | 5/2019 |

(Continued)

OTHER PUBLICATIONS

Xu, Jingwei, Li Song, and Rong Xie. "Shot boundary detection using convolutional neural networks." 2016 Visual Communications and Image Processing (VCIP). IEEE, 2016.*
(Continued)

*Primary Examiner* — Li Liu
(74) *Attorney, Agent, or Firm* — WPAT, P.C

(57) ABSTRACT

A system for automatically placing virtual advertisements in sports videos, which includes a shot detection module, background extraction module, a calibration module and an asset placement module. The shot detection module detects the target shot of a sports video via a first trained model. The background extraction module performs a background extraction to extract the background of the first frame of the target shot to obtain a first background mask. The calibration module performs a camera calibration to detect a first transformation relation, between the first frame and a sport field template, via a second trained model. The asset placement module transforms an advertisement asset according to the first transformation relation to obtain a first transformed asset, and execute an asset placement to place the first transformed asset onto the first frame according to the first background mask to obtain a first image frame with placed advertisement.

31 Claims, 11 Drawing Sheets

(51) Int. Cl.
    *G06V 20/40*      (2022.01)
    *H04N 5/222*      (2006.01)
    *H04N 5/272*      (2006.01)
    *H04N 21/234*     (2011.01)

(52) U.S. Cl.
    CPC ......... *H04N 5/2224* (2013.01); *H04N 5/2723* (2013.01); *G06T 2207/20081* (2013.01); *G06T 2207/20084* (2013.01)

(58) Field of Classification Search
    CPC ....... H04N 21/23418; H04N 21/44008; G06N 3/08; G06N 3/045; G06T 7/194; G06T 19/006; G06T 2207/20081; G06T 2207/20084; G06V 10/247; G06V 10/82; G06V 20/42
    See application file for complete search history.

(56) References Cited

U.S. PATENT DOCUMENTS

| | | | |
|---|---|---|---|
| 10,362,364 | B2 | 7/2019 | Popkiewicz et al. |
| 10,544,923 | B1 | 1/2020 | Barrowman |
| 10,671,853 | B2 | 6/2020 | Harris et al. |
| 10,805,558 | B2 | 10/2020 | Dragon |
| 2010/0238351 | A1* | 9/2010 | Shamur .................. H04H 60/37 348/E5.062 |
| 2012/0180084 | A1* | 7/2012 | Huang .................. H04N 5/2224 725/32 |

FOREIGN PATENT DOCUMENTS

| | | |
|---|---|---|
| CN | 110163640 A | 8/2019 |
| TW | 201019997 A | 6/2010 |
| TW | 201310986 | 3/2013 |
| TW | 201900250 A | 1/2019 |
| TW | I701642 | 8/2020 |

OTHER PUBLICATIONS

Sha, Long, et al. "End-to-end camera calibration for broadcast videos." Proceedings of the IEEE/CVF conference on computer vision and pattern recognition. 2020.*

Yu, Xinguo, et al. "Automatic camera calibration of broadcast tennis video with applications to 3D virtual content insertion and ball detection and tracking." Computer Vision and Image Understanding 113 (2009): 643-652.*

Chang, Chia-Hu, et al. "ViSA: virtual spotlighted advertising." Proceedings of the 16th ACM international conference on Multimedia. 2008.*

Chang et al. "Virtual spotlighted advertising for tennis videos", https://www.sciencedirect.com/science/article/pii/S1047320310000386, Mar. 20, 2010, J. Vis. Commun. Image R.

Huang et al. "Virtual ads insertion in street building views for augmented reality", https://ieeexplore.ieee.org/abstract/document/6115623, 2011, IEEE International Conference on Image Processing.

Li et al. "Real Time Advertisement Insertion in Baseball Video Based on Advertisement Effect", https://dl.acm.org/doi/pdf/10.1145/1101149.1101221, Nov. 2005, Proceedings of the 13th annual ACM international conference on Multimedia.

Wong et al. "Markerless Augmented Advertising for Sports Videos", https://link.springer.com/chapter/10.1007/978-3-030-21074-8_39, Jul. 22, 2019, Computer Vision and Pattern Recognition, Cornell University.

Li et al. "End-to-End Texture-Aware and Depth-Aware Embedded Advertising for Videos", https://dl.acm.org/doi/abs/10.1145/3397125.3397133, 2020, ACM.

Chen et al. "Automatic Insertion Ofadvertisementsinto a Video Sequence", https://ieeexplore.ieee.org/document/5580493, Jul. 11-14, 2010, Proceedings of the Ninth International Conference on Machine Learning and Cybernetics, Qingdao, China.

TW OA issued on Aug. 4, 2023.

* cited by examiner

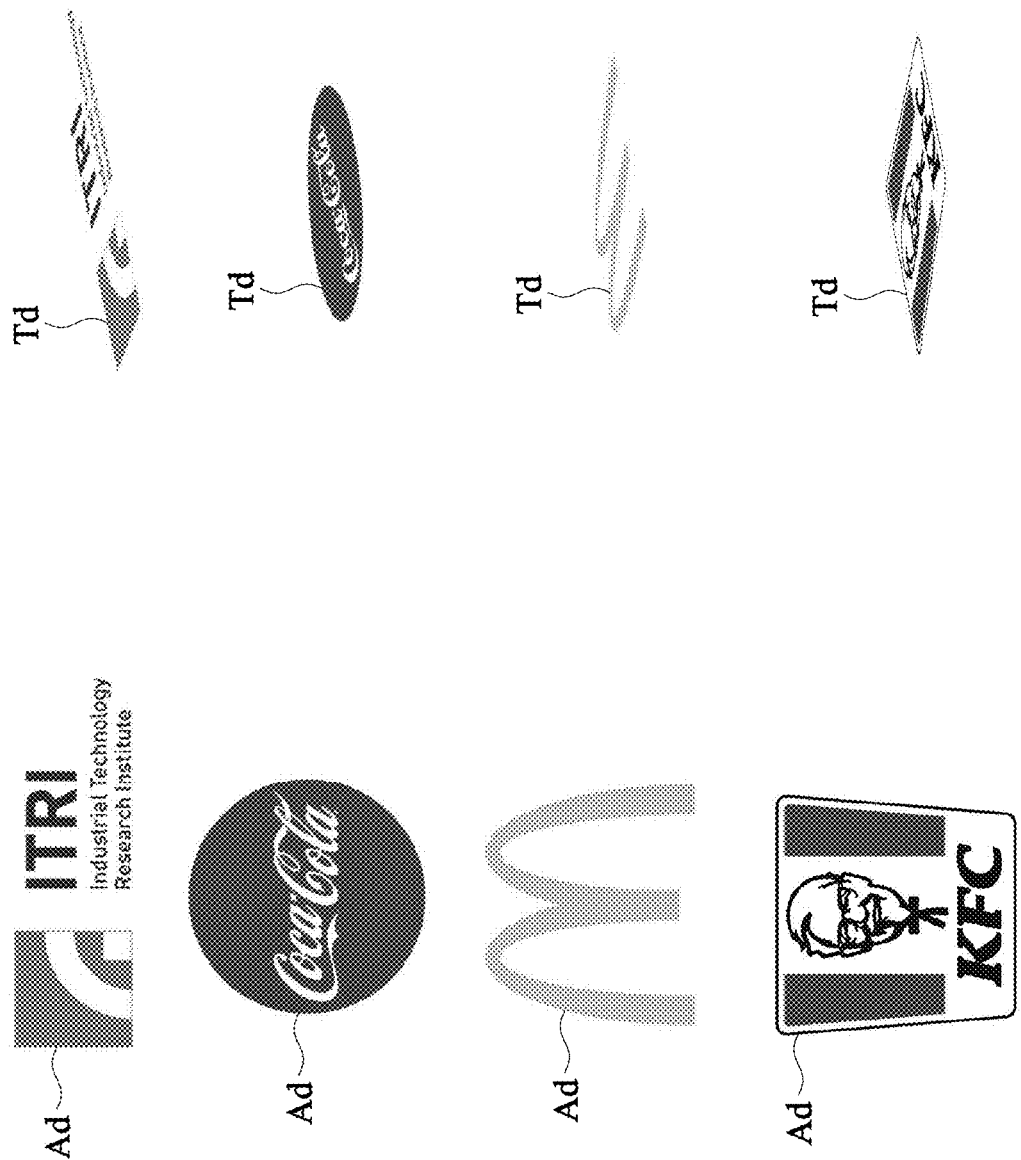

SYSTEM, NON-TRANSITORY COMPUTER READABLE STORAGE MEDIUM AND METHOD FOR AUTOMATICALLY PLACING VIRTUAL ADVERTISEMENTS IN SPORTS VIDEOS

TECHNICAL FIELD

The technical field relates to a system for automatically placing virtual advertisements in sports videos. The technical field further relates to a non-transitory computer readable storage medium for automatically placing virtual advertisements in sports videos and the method thereof.

BACKGROUND

Advertisements can be seen everywhere, such as shopping malls, radio stations, TVs, bus stations, train stations, baseball fields, football fields, stadiums, etc. Advertisements can effectively increase the sale of products so as to increase profits. In general, advertisements can be classified into two types, including in-stream advertisement and embedded advertisement. An in-stream advertisement may be added into a video, such as a TV program, a TV film, etc. However, the video must be interrupted by the in-stream advertisement when the in-stream advertisement is displayed, which may influence the experience of the viewer watching the video. An embedded advertisement is usually a static advertisement, so the advertising effectiveness thereof is usually low.

SUMMARY

An embodiment of the disclosure relates to a system for automatically placing virtual advertisements in sports videos, which includes a shot detection module, background extraction module, a calibration module and an asset placement module. The shot detection module detects the target shot of a sports video via a first trained model. The background extraction module performs a background extraction to extract the background of the first frame of the target shot to obtain a first background mask. The calibration module performs a camera calibration to detect a first transformation relation, between the first frame and the sport field template, via a second trained model. The asset placement module transforms an advertisement asset according to the first transformation relation to obtain a first transformed asset, and execute an asset placement to place the first transformed asset onto the first frame according to the first background mask to obtain a first image frame with placed advertisement.

Another embodiment of the disclosure relates to a method for automatically placing virtual advertisements in sports videos, which includes the following steps: detecting the target shot of a sports video via a first trained model; performing a background extraction to extract the background of the first frame of the target shot to obtain a first background mask; performing a camera calibration to detect a first transformation relation, between the first frame and a sport field template, via a second trained model; transforming an advertisement asset according to the first transformation relation to obtain a first transformed asset; and executing an asset placement to place the first transformed asset onto the first frame according to the first background mask to obtain a first image frame with placed advertisement.

Still another embodiment of the disclosure relates to a non-transitory computer readable storage medium storing one or more instructions that when executed by a processor cause the processor to perform: detecting the target shot of a sports video via a first trained model; performing a background extraction to extract the background of the first frame of the target shot to obtain a first background mask; performing a camera calibration to detect a first transformation relation, between the first frame and a sport field template, via a second trained model; transforming an advertisement asset according to the first transformation relation to obtain a first transformed asset; and executing an asset placement to place the first transformed asset onto the first frame according to the first background mask to obtain a first image frame with placed advertisement.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein:

FIG. 7A is a schematic view of an advertisement asset provided by the system for automatically placing virtual advertisements in sports videos in accordance with one embodiment of the disclosure.

FIG. 7B is a schematic view of a transformed advertisement asset provided by the system for automatically placing virtual advertisements in sports videos in accordance with one embodiment of the disclosure.

DETAILED DESCRIPTION

Figure 1:
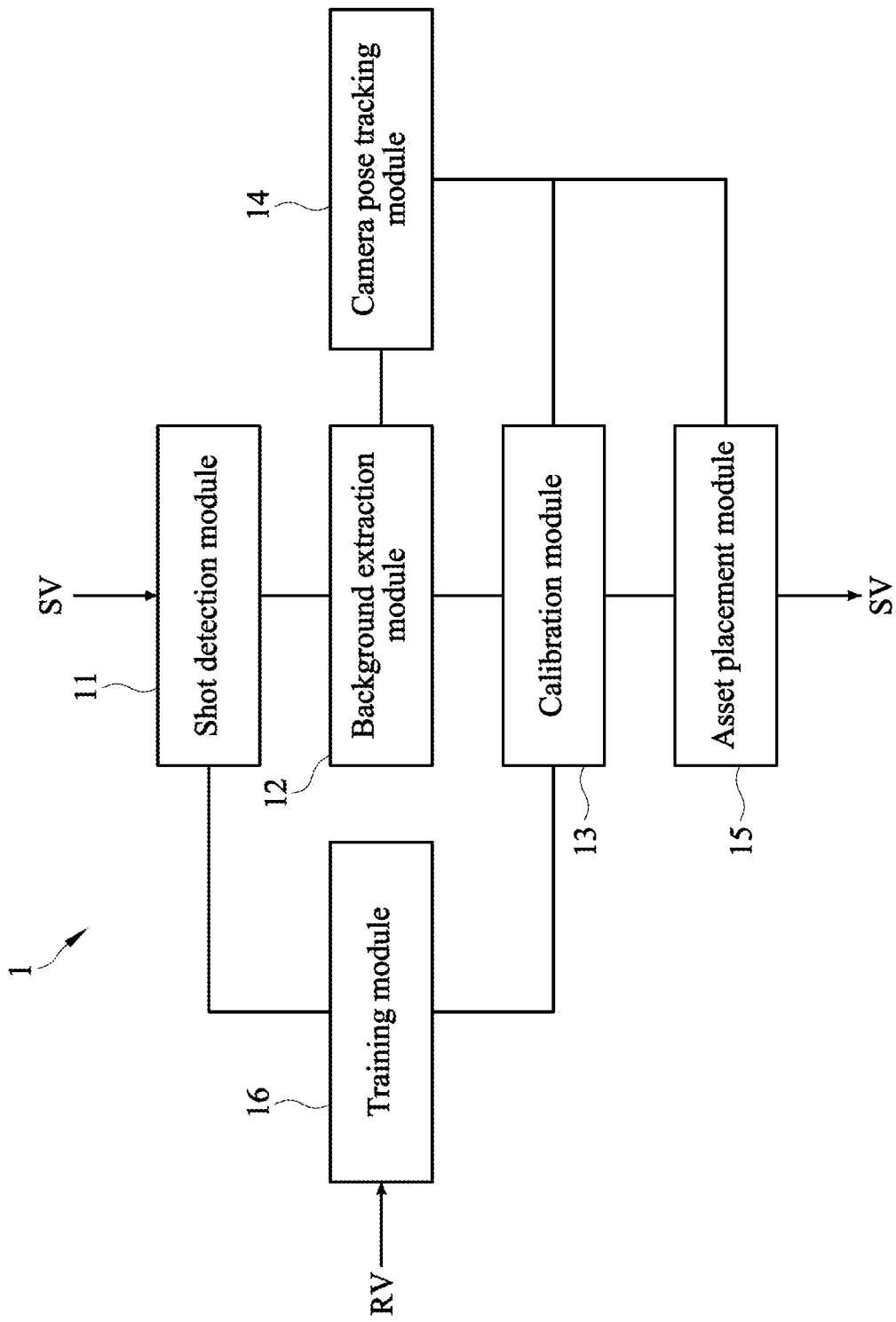
FIG. 1 is a block diagram of a system for automatically placing virtual advertisements in sports videos in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of a system for automatically placing virtual advertisements in sports videos in accordance with one embodiment of the disclosure. As shown in FIG. 1, the system 1 includes a shot detection module 11, a background extraction module 12, a calibration module 13, a camera pose tracking module 14, an asset placement module 15 and a training module 16. The system 1 can place an advertisement asset onto a sports video SV to obtain a sports video with placed advertisement FV. In one embodiment, the sports video SV may be, but not limited to, a soccer match video, a basketball match video, a football match video, volleyball match video, car racing video, etc.

The sports video SV can be inputted into the shot detection module 11. Then, the shot detection module 11 detects at least one target shot of the sports video SV via a first trained model. The shot detection module 11 can perform a shot-of-interest (SOI) detection for the sports video to obtain one or more SOIs to serve as the target shot(s). In one embodiment, the sports video SV may be, but not limited to, a recorded sports video, a live sports video streaming, etc.

Please refer to FIG. 2 and FIG. 3A-FIG. 3D, which are a flow chart and schematic views of a training process of a first trained model of the system for automatically placing virtual advertisements in sports videos in accordance with one embodiment of the disclosure respectively; please also refer to FIG. 1. As shown in FIG. 1, the training module 16 can perform a first training process in advance in order to obtain the first trained model.

First, the training module 16 receives a plurality of training videos. The type of training video RV may be similar to that of the target sports video SV. For example, if the sports video SV is a soccer match video, the training videos RV are also soccer match videos. Similarly, if the sports video is a basketball match video, the training videos RV are also basketball match videos.

Figure 3A:
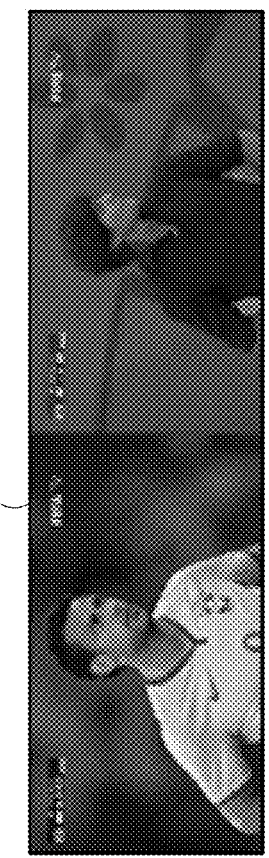
FIG. 3A~FIG. 3D are schematic views of the training process of the first trained model of the system for automatically placing virtual advertisements in sports videos in accordance with one embodiment of the disclosure.
Figure 3B:
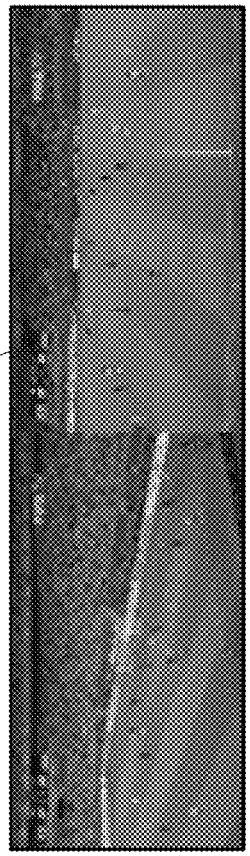
Figure 3C:
Figure 3D:

Afterward, the training module 16 classifies the shots of the training videos RV into different types via a pre-classification algorithm so as to obtain a labelled data. The above-mentioned types may include Type-1 (normal), Type-2 (focus), Type-3 (highlight) and Type-4 (others). As shown in FIG. 3A, the shot labelled by Type 1 (normal) can serve as the SOIs because these shots are the shots of the game being in progress and shows a part of the playing field or the whole playing field by a proper view angle. Thus, an advertisement asset is suitable to be placed onto the shots labelled by Type 1 (normal). As shown in FIG. 3B, the shots labelled by Type 2 (focus) may include only one or more players, play-by-play announcers or analysts. As shown in FIG. 3C, the shots labelled by Type-3 (highlight) may include only the highlights at the moment of goaling (e.g., the goals, the goal scorers, etc.). As shown in FIG. 3D, the shots labelled by Type-4 (others) may include only the information of the lineup of one of the teams, the interaction between the players and the coach, etc., as shown in FIG. 3D. Therefore, the shots labelled by Type-2 (focus), Type-3 (highlight) and Type-4 (others) are not suitable for the advertisement asset to be placed onto. In one embodiment, the pre-classification algorithm may be, but not limited to, histogram-based algorithms, feature-based algorithms, SVM-based algorithms, CNN-based algorithms or other relevant algorithms.

Figure 2:
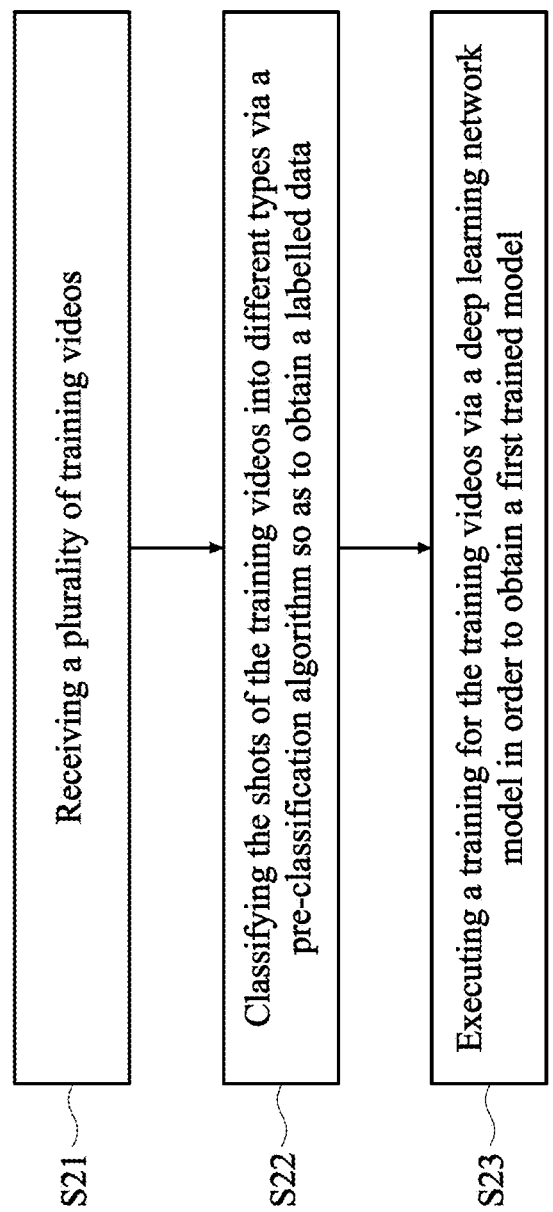
FIG. 2 is a flow chart of a training process of a first trained model of the system for automatically placing virtual advertisements in sports videos in accordance with one embodiment of the disclosure.

Then, the training module 16 inputs the labelled date in a first deep learning network model to perform a training for the labelled data in order to obtain the first trained model. In one embodiment, the first deep learning network model may be, but not limited to, TransNet, MobileNet and other similar deep learning network models. As shown in FIG. 2, the first training process includes the following steps:

Step S21: receiving a plurality of training videos.

Step S22: classifying the shots of the training videos into different types via a pre-classification algorithm so as to obtain a labelled data.

Step S23: executing a training for the training videos via a first deep learning network model in order to obtain a first trained model.

Figure 4A:
FIG. 4A~FIG. 4B are schematic views of a background extraction module performing a background extraction of the system for automatically placing virtual advertisements in sports videos in accordance with one embodiment of the disclosure.
Figure 4B:
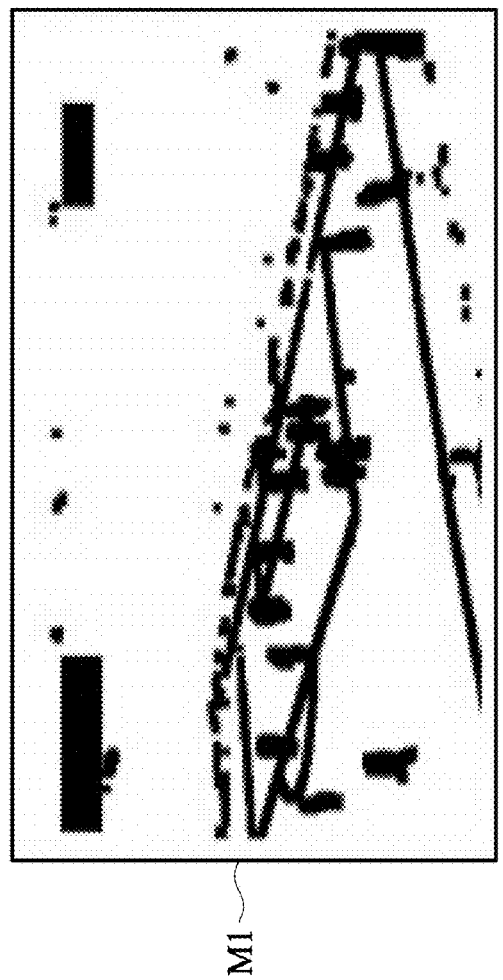

Please refer to FIG. 4A-FIG. 4B, which are schematic views of a background extraction module performing a background extraction of the system for automatically placing virtual advertisements in sports videos in accordance with one embodiment of the disclosure respectively; please also refer to FIG. 1. As shown in FIG. 1, the background extraction module 12 performs a background extraction to extract the background (the objects not in the playing field, such as the spectators, the cheerleading teams, etc.) of the first frame F1 (as shown in FIG. 4A) of the target short to obtain a first background mask M1 (the first background mask M1 is the background mask corresponding to the first frame F1, as shown in FIG. 4B). When performing the background extraction, the background extraction module 12 filters the first frame F1 by using chroma key (within a certain range which can be user-defined or adaptive) to obtain an initial background mask first (the foreground includes the playing field and the objects in the playing field, such as the players, the referees, etc.). Next, the background extraction module 12 denoises the initial background mask. Finally, the background extraction module 12 adds a predefined mask to the initial background mask so as to obtain the first background mask M1.

Figure 6A:
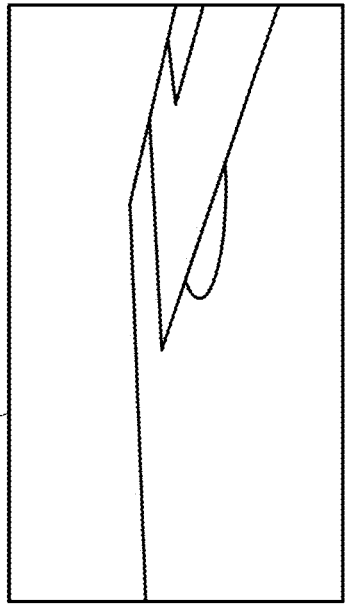
FIG. 6A~FIG. 6F are schematic views of the training process of the second trained model of the system for automatically placing virtual advertisements in sports videos in accordance with one embodiment of the disclosure.
Figure 6B:
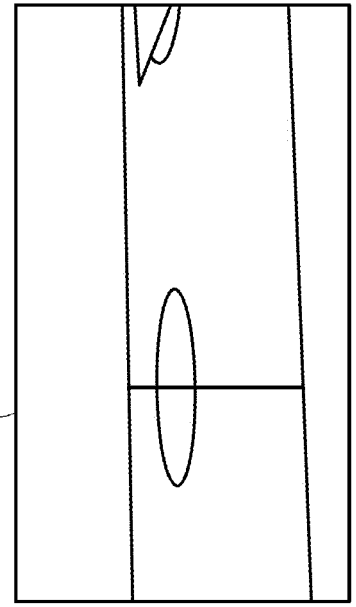
Figure 6C:
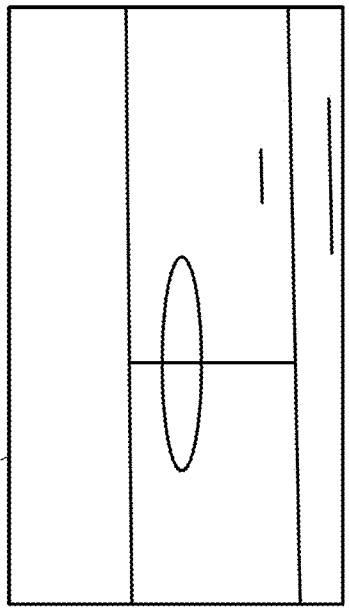
Figure 6D:
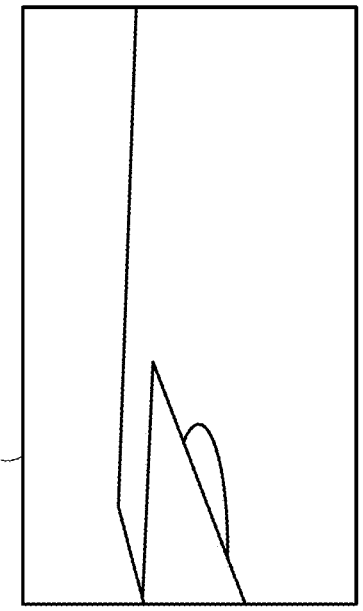
Figure 6F:
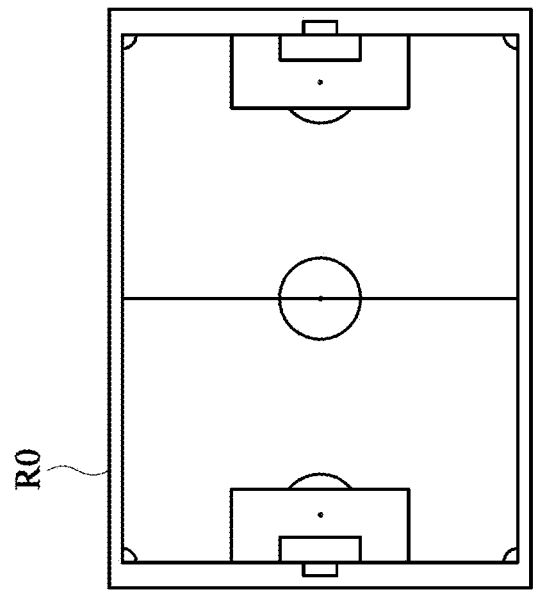
Figure 6E:
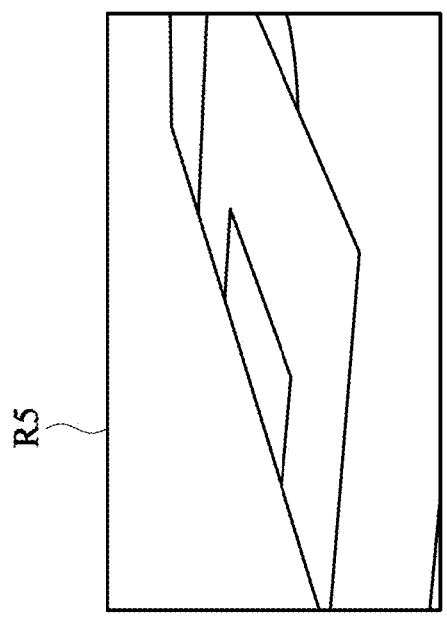

Afterward, the calibration module 13 performs a camera calibration to detect a first transformation relation, between the first frame F1 (the sport field in the image, as shown in FIG. 4A) and a sport field template R0 (as shown in FIG. 6F), via a second trained model. In this embodiment, the first transformation relation may be the homography between the first frame F1 and the sport field template R0 (or the homography between the camera whose camera pose corresponding to the first frame F1 and the playing field). The sport field template R0 is corresponding to a default camera pose. Since the camera may be adjusted by the PTZ (pan/tilt/zoom) controls, the camera poses corresponding to different frames may be different from each other.

Please refer to FIG. 5 and FIG. 6A-FIG. 6F, which are a flow chart and schematic views of a training process of a second trained model of the system for automatically placing virtual advertisements in sports videos in accordance with one embodiment of the disclosure respectively; please also refer to FIG. 1. As shown in FIG. 1, the training module 16 can perform a second training process in advance so as to obtain the second trained model.

First, the training module 16 receives a large number of training frames and each of the training frames has the transformation relation corresponding thereto; the frames R1-R5 shown in FIG. 6A-FIG. 6E are a part of these training frames. As shown in FIG. 6F, the sport field template R0 is the image of the top view of the playing field obtained by a camera hanging over the playing field and the center of the camera is corresponding to the center of the playing field. The view angle and the focus of this camera is the default camera pose. In this embodiment, the transformation relation of each of the training frames (such as the frames R1-R5) may be the homography between this frame and the sport field template R0 (or the homography between the camera whose camera pose corresponding to this frame and the playing field), so the camera poses corresponding to the training frames have different view angles and focuses. In another embodiment, the sport field template R0 may be changed according to actual requirements.

Figure 5:
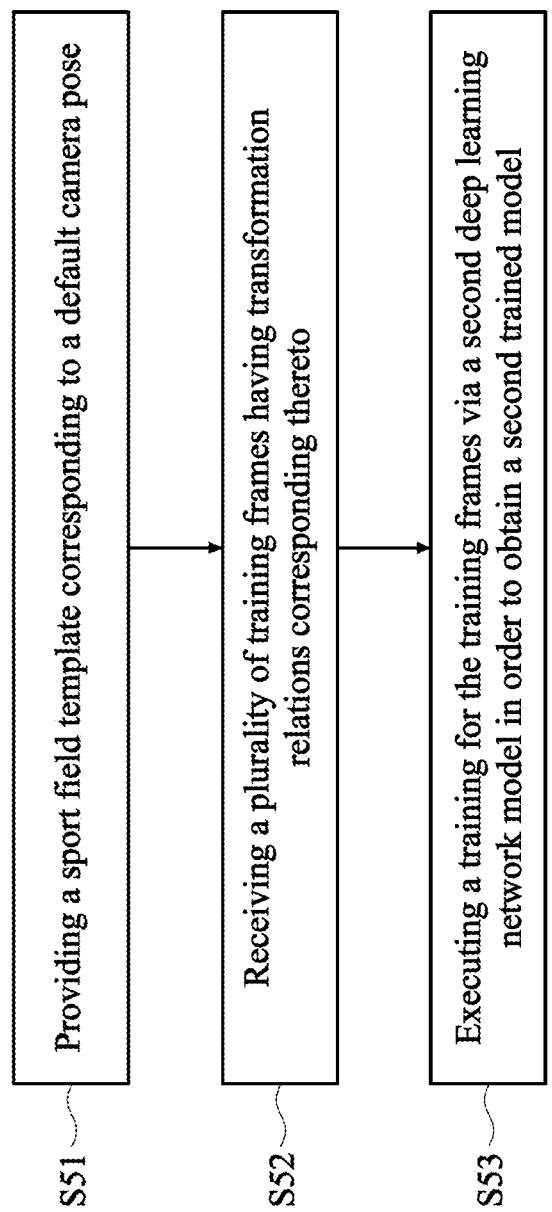
FIG. 5 is a flow chart of a training process of a second trained model of the system for automatically placing virtual advertisements in sports videos in accordance with one embodiment.

Next, the training module 16 inputs the training frames into a second deep learning network model to perform a training for the training frames so as to obtain the second trained model. In one embodiment, the second deep learning network model may be, but not limited to, GAN, Siames- eNet and other similar deep learning network models. In this way, the second trained model can effectively analyze a frame inputted into the second trained model, and detect the transformation relation between the inputted frame and the sport field template R0. As shown in FIG. 5, the second training process includes the following steps:

Step S51: providing a sport field template corresponding to a default camera pose.

Step S52: receiving a plurality of training frames having transformation relations corresponding thereto.

Step S53: executing a training for the training frames via a second deep learning network model in order to obtain a second trained model.

Figure 7C:
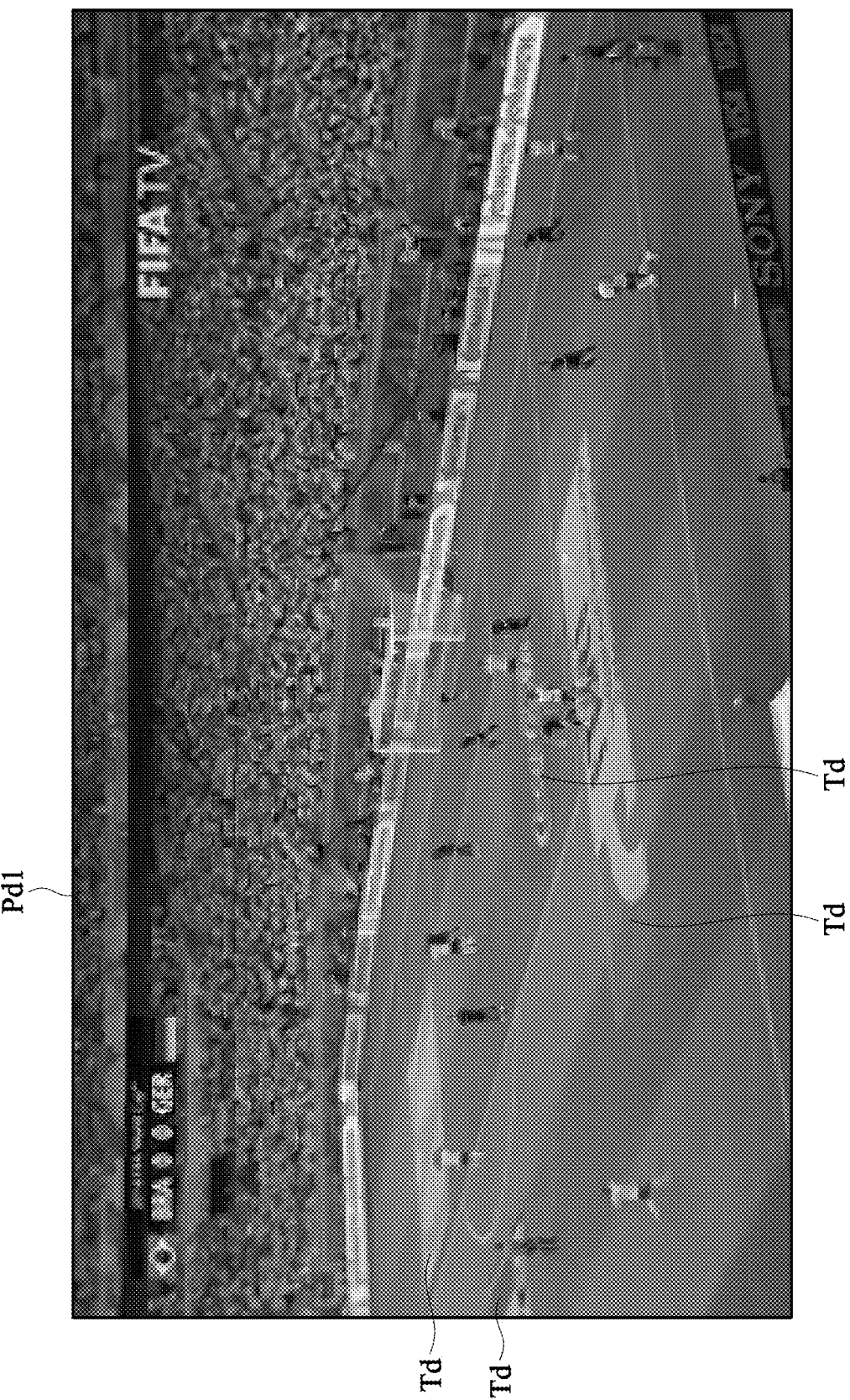
FIG. 7C is a schematic view of an image frame with placed advertisement provided by the system for automatically placing virtual advertisements in sports videos in accordance with one embodiment of the disclosure.

Please refer to FIG. 7A-'FIG. 7C, which are schematic views of an advertisement asset, a transformed advertisement asset and an image frame with placed advertisement provided by the system for automatically placing virtual advertisements in sports videos in accordance with one embodiment of the disclosure. As previously stated, the calibration module 13 performs the camera calibration to obtain the first transformation relation, between the first frame F1 and the sport field template R0.

Afterward, the asset placement module 15 transforms an advertisement asset Ad, as shown in FIG. 7A, according to the first transformation relation so as to obtain a first transformed asset Td, as shown in FIG. 7B. In this step, the asset placement module 15 performs an image warping for the advertisement asset Ad according to the first transformation relation to obtain the first transformed asset Td. In one embodiment, the advertisement asset Ad may be, but not limited to a text advertisement, a static image or an image having a dynamic visual effect and/or various special effects.

Then, the asset placement module 15 executes an asset placement to place the first transformed asset Td onto the first frame F1 according to the first background mask M1 to obtain a first image frame with placed advertisement Pd1. In this step, the asset placement module 15 performs a blending algorithm, such as Alpha blending, to blend the first frame F1 with the first background mask M1 to obtain a first blended frame first. In this way, the advertisement asset Ad can be more easily blended into the first blended frame. Next, the asset placement module 15 places the first transformed asset Td onto the first blended frame to obtain the first image frame with placed advertisement Pd1.

Afterward, as shown in FIG. 1, the background extraction module 12 performs the background extraction for the second frame of the target shot to obtain a second background mask (the second background mask is the background mask corresponding to the second frame).

As the camera calibration consumes a lot of computational resource, it is not a good idea to perform the camera calibration for all of the frames of the target shot in order to obtain the transformation relations (homographies) thereof. Accordingly, this embodiment adopts another technical means to replace the camera calibration. In this embodiment, the camera pose tracking module 14 performs a camera pose tracking to calculate a second transformation relation between the second frame and the sport field template R0 according to the second background mask. The second transformation relation may be the homography between the second frame and the sport field template R0 (or the homography between the camera whose camera pose corresponding to the second frame and the playing field).

When performing the camera pose tracking, the camera pose tracking module 14 executes a feature extraction to extract the features of the first frame F1 (previous frame) and the features of the second frame (current frame) first. The feature extraction can be carried out by Scale-Invariant Feature Transform (SIFT), Speeded Up Robust Features (SURF), Histogram of Oriented Gradient (HOG), Maximally stable extremal region extractor (MESR), Binary robust invariant scalable keypoints (BRISK), Oriented BRIEF (ORB), Features from accelerated segment test (FAST), KAZE or other similar algorithms.

Next, the camera pose tracking module 14 executes a feature matching for the first frame F1 (previous frame) and the second frame (current frame) according to the second background mask, and filters out the bad matching to obtain a feature matching result. The second background mask can be used to remove the moving objects not needed by the feature matching, such as the players, the referees, etc. The feature matching and filtering out the bad matching can be carried out by SIFT, SURF, MESR, BRISK, ORB, FAST, KAZE or other similar algorithms.

Then, the camera pose tracking module 14 calculates a frame transformation relation between the first frame F1 (previous frame) and the second frame (current frame) according to the feature matching result. For example, the camera pose tracking module 14 calculates the affine transformation between the first frame F1 and the second frame in order to obtain the above frame transformation.

Finally, the camera pose tracking module 14 multiplies the frame transformation relation by the first transformation relation in order to obtain the second transformation relation. In this way, the second transformation relation of the second frame can be directly obtained via the camera pose tracking performed by camera pose tracking module 14 rather than the camera calibration performed by the calibration module 13, which can save a large amount of computational resource.

Similarly, after the second transformation relation of the second frame is obtained, the asset placement module 15 transforms the advertisement asset Ad according to the second transformation relation to obtain a second transformed asset, and executes the asset placement to place the second transformed asset onto the second frame to obtain a second image frame with placed advertisement.

The transformation relations of the other frames (the third frame, the fourth frame, the fifth frame the final frame) of the target short can also be obtained via the camera pose tracking module 14 by executing the camera pose tracking. The asset placement module 15 can also transform the advertisement asset Ad according to the transformation relations of these frames to obtain the corresponding transformed assets, and executes the asset placement to place the transformed assets onto these frame to obtain the corresponding image frames with placed advertisement. Finally, the sports video with placed advertisement FV can be obtained after all frames of all target shots of the sports video SV are processed by the above mechanism.

However, the error scores of the transformation relations of the frames may keep increasing if the camera pose tracking is repeatedly executed. Therefore, the calibration module 13 may need to execute the camera calibration again if the error score of the transformation relation of any one of the frames exceeds an error threshold.

The following takes the second frame as an example. As set forth above, the camera pose tracking module 14 performs the camera pose tracking to calculate the second transformation relation between the second frame and the sport field template R0 according to the second background mask. In addition, the camera pose tracking module 14 can simultaneously obtain the error score of the second transformation relation. In one embodiment, the error score may be, but not limited to, the score of the accumulation error, the score of the re-projection error, etc. When the camera pose tracking module 14 determines that the error score of the second transformation relation is less than an error threshold, the camera pose tracking module 14 transmits the second transformation relation to the asset placement module 15. Then, the asset placement module 15 transforms the advertisement asset Ad according to the second transformation relation to obtain the second transformed asset, and executes the asset placement to place the second transformed asset onto the second frame to obtain the second image frame with placed advertisement.

On the contrary, when the camera pose tracking module 14 determines that the error score of the second transformation relation is greater than or equal to the error threshold, the camera pose tracking module 14 transmits a notification to the calibration module 13. Afterward, the calibration module 13 re-executes the camera calibration for the second frame to detect a corrected second transformation relation, between the second frame and the sport field template R0, via the second trained model. Then, the asset placement module 15 transforms the advertisement asset Ad according to the corrected second transformation relation to obtain a second transformed asset, and executes the asset placement to place the second transformed asset onto the second frame according to the second background mask to obtain a second image frame with placed advertisement. The system 1 will perform the above operation for each of the frames except the first frame F1 to determine whether the camera calibration needs to be re-executed or not with a view to enhance the precision of the system 1.

Alternatively, the camera calibration module 13 can automatically re-execute the camera calibration at regular time intervals in order to obtain the corrected transformation relation of the current frame, which can also enhance the precision of the system 1.

As described above, the system 1 according to this embodiment can effectively place the advertisement asset Ad onto the sports video SV to provide the sports video with placed advertisement FV, Thus, the viewer can directly see the advertisement when watching the sports video with placed advertisement FV, which will not influence the experience of the viewer watching the sports video.

In addition, the advertisement asset Ad may have a dynamic visual effect and/or various special effects, so the advertisement placed onto the sports video can be more eye-catching and the advertising effectiveness thereof can be further enhanced.

The system 1 can be applicable to various sports videos. Besides, the system 1 can also be applicable to other types of videos, such as concert videos, speech videos, etc.

The embodiment just exemplifies the disclosure and is not intended to limit the scope of the disclosure. Any equivalent modification and variation according to the spirit of the disclosure is to be also included within the scope of the following claims and their equivalents.

It is worthy to point out that when an in-stream advertisement is added in a video, the video must be interrupted by the in-stream advertisement when the in-stream advertisement is displayed, which may influence the experience of the viewer watching the video. On the contrary, according to one embodiment of the disclosure, the system for automatically placing virtual advertisements in sports videos can effectively place an advertisement asset onto a sports video to provide a sports video with placed advertisement, so the viewer can directly see the virtual advertisement when watching the sports video with placed advertisement, which will not influence the experience of the viewer watching the sports video.

Besides, an embedded advertisement is usually a static advertisement, so the advertising effectiveness thereof is usually low. On the contrary, according to one embodiment of the disclosure, the system for automatically placing virtual advertisements in sports videos can effectively place an advertisement asset having a dynamic visual effect (e.g., a 3D effect, an iridescence effect, etc.) and/or various special effects onto a sports video to provide a sports video with placed advertisement. Thus, the virtual advertisement placed onto the sports video can be more eye-catching and the advertising effectiveness thereof can be further enhanced.

Further, according to one embodiment of the disclosure, the system for automatically placing virtual advertisements in sports videos can place an advertisement asset onto a sports video to provide a sports video with placed advertisement and the advertisement asset can be replaced by another one according to the requirements of the sponsor/advertiser. Thus, the system can be applicable to different kinds of sports videos and can satisfy the requirements of different sponsors/advertisers, so the application thereof can be more comprehensive.

Moreover, according to one embodiment of the disclosure, the advertisement placing function of the system can be realized with or without hardware equipment. Accordingly, the system can be more flexible in use and the cost thereof can be significantly reduced. As described above, the system and method for automatically placing virtual advertisements in sports videos in accordance with the embodiments of the disclosure can achieve great technical effect.

Figure 8:
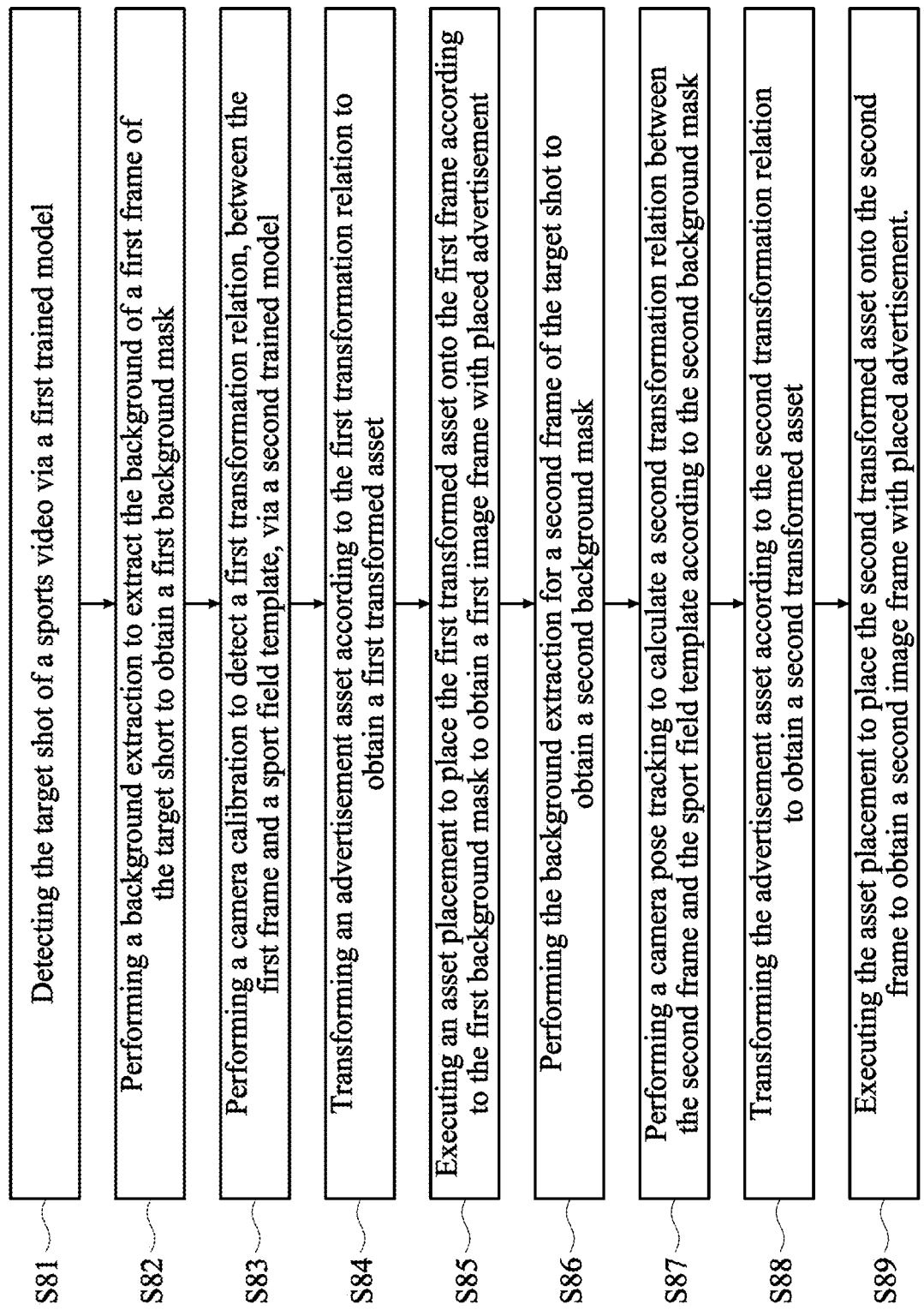
FIG. 8 is a flow chart of a method for automatically placing virtual advertisements in sports videos in accordance with one embodiment of the disclosure.

Please refer to FIG. 8, which is a flow chart of a method for automatically placing virtual advertisements in sports videos in accordance with one embodiment of the disclosure. The method according to this embodiment includes the following steps:

Step S81: detecting the target shot of a sports video via a first trained model.

Step S82: performing a background extraction to extract the background of a first frame of the target short to obtain a first background mask.

Step S83: performing a camera calibration to detect a first transformation relation, between the first frame and a sport field template, via a second trained model.

Step S84: transforming an advertisement asset according to the first transformation relation to obtain a first transformed asset.

Step S85: executing an asset placement to place the first transformed asset onto the first frame according to the first background mask to obtain a first image frame with placed advertisement.

Step S86: performing the background extraction for a second frame of the target shot to obtain a second background mask.

Step S87: performing a camera pose tracking to calculate a second transformation relation between the second frame and the sport field template according to the second background mask.

Step S88: transforming the advertisement asset according to the second transformation relation to obtain a second transformed asset.

Step S89: executing the asset placement to place the second transformed asset onto the second frame to obtain a second image frame with placed advertisement.

The above method can be implemented by a processor which executes one or more instructions stored in a non-transitory computer readable storage medium.

Figure 9:
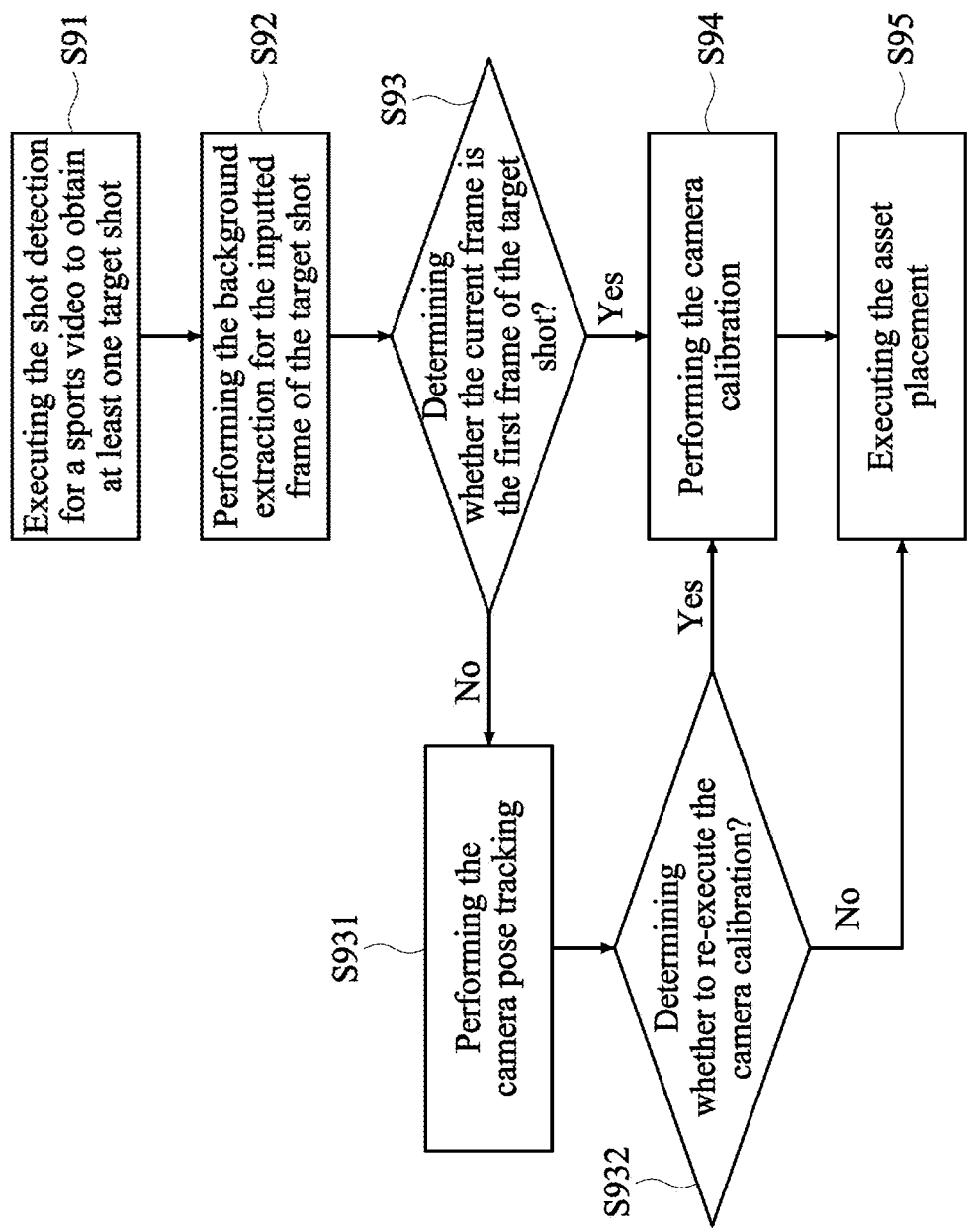
FIG. 9 is a flow chart of a method for automatically placing virtual advertisements in sports videos in accordance with another embodiment of the disclosure.

Please refer to FIG. 9, which is a flow chart of a method for automatically placing virtual advertisements in sports videos in accordance with another embodiment of the disclosure. The method according to this embodiment includes the following steps:

Step S91: executing the shot detection for a sports video to obtain at least one target shot; then, the process proceeds to Step S92. In this step, the shot detection module 11 performs the SOI detection for the sports video SV to obtain at least one SOI to serve as the target shot.

Step S92: performing the background extraction for the inputted frame of the target shot; then, the process proceeds to Step S93. In this step, the background extraction module 12 performs the background extraction to extract the background of the inputted frame of the target shot in order to obtain the background mask thereof.

Step S93: determining whether the current frame is the first frame of the target shot? If it is, the process proceeds to Step S94; if it is not, the process proceeds to Step S931.

Step S94: performing the camera calibration; then, the process proceeds to Step S95. In this step, the calibration module 13 needs to perform the camera calibration for the first time in order to detect the transformation relation (homography) of the current frame if the current frame is the first frame F1 of target shot. The transformation relation obtained via the camera calibration can serve as the basis of performing the camera pose tracking later. Alternatively, the calibration module 13 needs to re-execute the camera calibration for the current frame if the error score of the transformation relation of the current frame obtained via the camera pose tracking is greater than or equal to the error threshold.

Step S95: executing the asset placement. In this step, the asset placement module 15 performs the image warping for the advertisement asset according to the transformation relation of the current frame to obtain the transformed asset. Then, the asset placement module 15 executes the asset placement to place the transformed asset onto the current frame according to the background mask of the current frame to obtain the image frame with placed advertisement.

Step S931: performing the camera pose tracking; then, the process proceeds to Step S932. In this step, the camera pose tracking module 14 directly performs the camera pose tracking to calculate the transformation relation of the current frame according to the background mask thereof. When performing the camera pose tracking, the camera pose tracking module 14 executes the feature extraction to extract the features of the previous frame and the features of the current frame first. Then, the camera pose tracking module 14 executes the feature matching for the previous frame and the current frame according to the background mask of the current frame, and filters out the bad matching to obtain the feature matching result. Afterward, the camera pose tracking module 14 calculates the frame transformation relation between the previous frame and the current frame according to the feature matching result. Finally, the camera pose tracking module 14 multiplies the frame transformation relation by the transformation relation of the previous frame in order to obtain the transformation relation of the current frame.

Step S932: determining whether to re-execute the camera calibration? If it does, the process proceeds to Step S94; if it does not, the process proceeds to Step S95. In this step, after the camera pose tracking module 14 obtains the error score (e.g., the score of the accumulation error or the score of the re-projection error) of the transformation relation of the current frame by performing the camera pose tracking, the camera pose tracking module 14 determines whether to re-execute the camera calibration according to the error score.

The above method can be implemented by a processor which executes one or more instructions stored in a non-transitory computer readable storage medium.

To sum up, according to one embodiment of the disclosure, the system for automatically placing virtual advertisements in sports videos can effectively place an advertisement asset onto a sports video to provide a sports video with placed advertisement, so the viewer can directly see the virtual advertisement when watching the sports video with placed advertisement, which will not influence the experience of the viewer watching the sports video.

Besides, according to one embodiment of the disclosure, the system for automatically placing virtual advertisements in sports videos can effectively place an advertisement asset having a dynamic visual effect (e.g., a 3D effect, an iridescence effect, etc.) and/or various special effects onto a sports video to provide a sports video with placed advertisement. Thus, the virtual advertisement placed onto the sports video can be more eye-catching and the advertising effectiveness thereof can be further enhanced.

Further, according to one embodiment of the disclosure, the system for automatically placing virtual advertisements in sports videos can place an advertisement asset onto a sports video to provide a sports video with placed advertisement and the advertisement asset can be replaced by another one according to the requirements of the sponsor/advertiser. Thus, the system can be applicable to different kinds of sports videos and can satisfy the requirements of different sponsors/advertisers, so the application thereof can be more comprehensive.

Moreover, according to one embodiment of the disclosure, the advertisement placing function of the system can be realized with or without hardware equipment. Accordingly, the system can be more flexible in use and the cost thereof can be significantly reduced.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer (or a processor). As an example, an embodiment of a computer program product includes a computer useable storage medium to store a computer readable program.

The computer useable or computer readable storage medium can be an electronic, magnetic, optical, electromagnetic, infrared, or semiconductor system (or apparatus or device). Examples of non-transitory computer useable and computer readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention (or each module of the system) may be implemented entirely in hardware, entirely in software or in an implementation containing both hardware and software elements. In embodiments which use software, the software may include, but not limited to, firmware, resident software, microcode, etc. In embodiments which use hardware, the hardware may be implemented within one or more application specific integrated circuits (ASICs), digital signal processors (DSPs), digital signal processing devices (DSPDs), programmable logic devices (PLDs), field programmable gate arrays (FPGAs), central-processing unit (CPU), controllers, microcontrollers, microprocessors, electronic devices, other electronic units designed to perform the functions described herein, or a combination thereof.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for automatically placing virtual advertisements in sports videos, comprising:
   a shot detection module, configured to detect a target shot of a sports video via a first trained model;
   a background extraction module, configured to perform a background extraction to extract a background of a first frame of the target shot to obtain a first background mask;
   a calibration module, configured to perform a camera calibration to detect a first transformation relation, between the first frame and a sport field template, via a second trained model; and
   an asset placement module, configured to transform an advertisement asset according to the first transformation relation to obtain a first transformed asset, and execute an asset placement to place the first transformed asset onto the first frame according to the first background mask to obtain a first image frame with placed advertisement.

2. The system for automatically placing virtual advertisements in sports videos of claim 1, further comprising a training module configured to perform a first training process for at least one training video via a first deep learning network model in order to obtain the first trained model.

3. The system for automatically placing virtual advertisements in sports videos of claim 1, further comprising a training module configured to perform a second training process for a plurality of training frames having transformation relations corresponding thereto via a second deep learning network model so as to obtain the second trained model.

4. The system for automatically placing virtual advertisements in sports videos of claim 1, wherein the background extraction module filters the first frame by a chroma key to obtain an initial background mask, denoises the initial background mask and adds a predefined mask to the initial background mask to obtain the first background mask.

5. The system for automatically placing virtual advertisements in sports videos of claim 1, wherein the asset placement module performs the asset placement to blend the first frame with the first background mask to obtain a first blended frame, and places the first transformed asset onto the first blended frame to obtain the first image frame with placed advertisement.

6. The system for automatically placing virtual advertisements in sports videos of claim 1, wherein the first transformation relation is a homography between the first frame and the sport field template, and the sport field template is corresponding to a default camera pose.

7. The system for automatically placing virtual advertisements in sports videos of claim 1, wherein the background extraction module performs the background extraction for a second frame of the target shot to obtain a second background mask.

8. The system for automatically placing virtual advertisements in sports videos of claim 7, further comprising a camera pose tracking module configured to perform a camera pose tracking to calculate a second transformation relation between the second frame and the sport field template according to the second background mask.

9. The system for automatically placing virtual advertisements in sports videos of claim 8, wherein the second transformation relation is a homography between the second frame and the sport field template, and the sport field template is corresponding to a default camera pose.

10. The system for automatically placing virtual advertisements in sports videos of claim 8, wherein the asset placement module transforms the advertisement asset according to the second transformation relation to obtain a second transformed asset, and executes the asset placement to place the second transformed asset onto the second frame to obtain a second image frame with placed advertisement.

11. The system for automatically placing virtual advertisements in sports videos of claim 8, wherein the camera pose tracking module performs the camera pose tracking to execute a feature matching for the first frame and the second frame according to the second background mask to obtain a feature matching result, calculates a frame transformation relation between the first frame and the second frame according to the feature matching result and multiplies the frame transformation relation by the first transformation relation in order to obtain the second transformation relation.

12. The system for automatically placing virtual advertisements in sports videos of claim 8, wherein when the camera pose tracking module determines that an error score of the second transformation relation is greater than or equal to an error threshold, the calibration module re-executes the camera calibration for the second frame to detect a corrected second transformation relation, between the second frame and the sport field template, via the second trained model, wherein the asset placement module transforms the advertisement asset according to the corrected second transformation relation to obtain a second transformed asset, and executes the asset placement to place the second transformed asset onto the second frame according to the second background mask to obtain a second image frame with placed advertisement.

13. The system for automatically placing virtual advertisements in sports videos of claim 12, wherein the error score is a score of a reprojection error or an accumulation error.

14. A method for automatically placing virtual advertisements in sports videos, comprising:
   detecting a target shot of a sports video via a first trained model;
   performing a background extraction to extract a background of a first frame of the target short to obtain a first background mask;
   performing a camera calibration to detect a first transformation relation, between the first frame and a sport field template, via a second trained model;
   transforming an advertisement asset according to the first transformation relation to obtain a first transformed asset; and
   executing an asset placement to place the first transformed asset onto the first frame according to the first background mask to obtain a first image frame with placed advertisement.

15. The method for automatically placing virtual advertisements in sports videos of claim 14, further comprising:
   performing a first training process for at least one training video via a first deep learning network model in order to obtain the first trained model.

16. The method for automatically placing virtual advertisements in sports videos of claim 14, further comprising:
   performing a second training process for a plurality of training frames having transformation relations corresponding thereto via a second deep learning network model so as to obtain the second trained model.

17. The method for automatically placing virtual advertisements in sports videos of claim 14, wherein a step of performing the background extraction to extract the background of the first frame to obtain the first background mask further comprises:
   filtering the first frame by a chroma key to obtain an initial background mask;
   denoising the initial background mask; and
   adding a predefined mask to the initial background mask to obtain the first background mask.

18. The method for automatically placing virtual advertisements in sports videos of claim 14, further comprising:
   performing the background extraction for a second frame of the target shot to obtain a second background mask.

19. The method for automatically placing virtual advertisements in sports videos of claim 18, further comprising:
   performing a camera pose tracking to calculate a second transformation relation between the second frame and the sport field template according to the second background mask.

20. The method for automatically placing virtual advertisements in sports videos of claim 19, further comprising:
   transforming the advertisement asset according to the second transformation relation to obtain a second transformed asset, and
   executing the asset placement to place the second transformed asset onto the second frame to obtain a second image frame with placed advertisement.

21. The method for automatically placing virtual advertisements in sports videos of claim 19, wherein a step of performing the camera pose tracking to calculate the second transformation relation between the second frame and the sport field template according to the second background mask further comprises:
   executing a feature matching for the first frame and the second frame according to the second background mask to obtain a feature matching result;
   calculating a frame transformation relation between the first frame and the second frame according to the feature matching result; and
   multiplying the frame transformation relation by the first transformation relation in order to obtain the second transformation relation.

22. The method for automatically placing virtual advertisements in sports videos of claim 19, further comprising:
   re-executing the camera calibration for the second frame to detect a corrected second transformation relation, between the second frame and the sport field template, via the second trained model when an error score of the second transformation relation is greater than or equal to an error threshold;
   transforming the advertisement asset according to the corrected second transformation relation to obtain a second transformed asset, and
   executing the asset placement to place the second transformed asset onto the second frame according to the second background mask to obtain a second image frame with placed advertisement.

23. A non-transitory computer readable storage medium storing one or more instructions that when executed by a processor cause the processor to perform:
   detecting a target shot of a sports video via a first trained model;
   performing a background extraction to extract a background of a first frame of the target short to obtain a first background mask;
   performing a camera calibration to detect a first transformation relation, between the first frame and a sport field template, via a second trained model;
   transforming an advertisement asset according to the first transformation relation to obtain a first transformed asset; and
   executing an asset placement to place the first transformed asset onto the first frame according to the first background mask to obtain a first image frame with placed advertisement.

24. The non-transitory computer readable storage medium of claim 23, wherein the processor is further configured to perform a first training process for at least one training video via a first deep learning network model in order to obtain the first trained model.

25. The non-transitory computer readable storage medium of claim 23, wherein the processor is further configured to perform a second training process for a plurality of training frames having transformation relations corresponding thereto via a second deep learning network model so as to obtain the second trained model.

26. The non-transitory computer readable storage medium of claim 23, wherein the processor is configured to filter the first frame by a chroma key to obtain an initial background mask, denoise the initial background mask and add a predefined mask to the initial background mask to obtain the first background mask when performing the background extraction.

27. The non-transitory computer readable storage medium of claim 23, wherein the processor is further configured to perform the background extraction for a second frame of the target shot to obtain a second background mask.

28. The non-transitory computer readable storage medium of claim 27, wherein the processor is further configured to perform a camera pose tracking to calculate a second transformation relation between the second frame and the sport field template according to the second background mask.

29. The non-transitory computer readable storage medium of claim 28, wherein the processor is further configured to transform the advertisement asset according to the second transformation relation to obtain a second transformed asset and execute the asset placement to place the second transformed asset onto the second frame to obtain a second image frame with placed advertisement.

30. The non-transitory computer readable storage medium of claim 28, wherein the processor is configured to execute a feature matching for the first frame and the second frame according to the second background mask to obtain a feature matching result, calculate a frame transformation relation between the first frame and the second frame according to the feature matching result and multiply the frame transformation relation by the first transformation relation in order to obtain the second transformation relation when performing the camera pose tracking.

31. The non-transitory computer readable storage medium of claim 28, wherein the processor is further configured to re-executing the camera calibration for the second frame to detect a corrected second transformation relation, between the second frame and the sport field template, via the second trained model when an error score of the second transformation relation is greater than or equal to an error threshold, transform the advertisement asset according to the corrected second transformation relation to obtain a second transformed asset and execute the asset placement to place the second transformed asset onto the second frame according to the second background mask to obtain a second image frame with placed advertisement.

\* \* \* \* \*